United States Patent [19]

Breen

[11] Patent Number: 4,710,843

[45] Date of Patent: Dec. 1, 1987

[54] SELECTABLE INTEGRATING CHARACTERISTIC TIMER

[75] Inventor: Thomas B. Breen, Landsdowne, Pa.

[73] Assignee: General Electric Company, King of Prussia, Pa.

[21] Appl. No.: 813,793

[22] Filed: Dec. 27, 1985

[51] Int. Cl.[4] ............................................. H02H 3/093
[52] U.S. Cl. ...................................... 361/96; 361/94; 361/85
[58] Field of Search ...................... 361/76, 83, 93, 94, 361/95, 96, 97, 98; 307/269, 590, 592; 364/480, 483

[56] References Cited

U.S. PATENT DOCUMENTS

| | | | |
|---|---|---|---|
| 4,012,669 | 3/1977 | Gelfand et al. | 361/97 |
| 4,180,842 | 12/1979 | Keeny | 361/85 |
| 4,316,230 | 2/1982 | Hansen et al. | 361/96 X |
| 4,405,966 | 9/1983 | Cavero | 361/85 X |
| 4,420,789 | 12/1983 | Breen | 361/96 X |
| 4,438,476 | 3/1984 | Breen | 361/97 X |
| 4,486,803 | 12/1984 | Zylstra | 361/96 X |

Primary Examiner—A. D. Pellinen
Assistant Examiner—A. Jonathan Wysocki
Attorney, Agent, or Firm—Henry J. Policinski

[57] ABSTRACT

A characteristic timer, for a protective relay which provides protection for a portion of an AC transmission line, exhibits a phase characteristic which is always integrating and a ground characteristic which changes from non-integrating to integrating as a function of input signal pulse width and a preselected cut off time. The ground characteristic begins to integrate upon expiration of the preselected cut off time or if the input signal pulse width exceeds a predetermined check level of magnitude during the cut off time. If the pulse width magnitude of the input pulse is less than or equal to the predetermined check level magnitude during the cut off time, the characteristic will be non-integrating.

7 Claims, 9 Drawing Figures

SELECTABLE INTEGRATING CHARACTERISTIC TIMER

BACKGROUND OF THE INVENTION

This invention relates to relays for protecting a portion of a high voltage transmission line, and more particularly to characteristic timers for use with such protective relays.

Characteristic timers are frequently employed to determine the activation time of a protective relay. One such characteristic timer is described in my U.S. Pat. No. 4,438,476, assigned to the same assignee of the present application and which is incorporated by reference as if fully set forth herein.

U.S. Pat. No. 4,438,476 describes a characteristic timer having digital logic adapted to external circuitry for selecting one or more desired phase angles which determines the activation time of the timer and which is further adapted to external circuitry for selecting an integrating or non-integrating type function for the characteristic timer. Although the characteristic timer described in my above referenced U.S. patent functions well for its desired objectives, it is considered desirable that a characteristic timer be provided with further features for providing added margin against transient overreach for phase-to-ground faults of a reactance relay while providing shorter clearing times.

In the characteristic timer described in my above referenced patent, the characteristic remains non-integrating for a time delay. The integration begins only after the cut-off timer times out, and the magnitude of the operate level is selectable. The term "integrating" is meant to represent that the characteristic timer monitors an applied signal for more than one cycle of the applied signal and integrates the result. Conversely, "non-integrating" in meant to represent that the monitoring and the result of the characteristic timer are dependent on a half cycle of the applied signal.

To increase the security of the relay operation, the operate level is normally chosen to be equal to the highest expected transient level. As a result, the relay is precluded from operation on the occurrence of transients therefore substantially preventing transient overreach. However, because the operate level is selected in this manner, the speed at which the relay will operate, for faults within the protected zone will decrease because bonafide faults having levels less than the preselected operate level, will not cause operation of the relay until after integration begins at the conclusion of the cut off time period. On the other hand, reducing the operate level to increase speed may cause the relay to operate on transients rather than bonofide faults within the protected zone, thereby degrading the security of operation.

Accordingly, one object of the present invention is to provide a characteristic timer having features which result in improved relay performance.

Another object of the present invention is to provide a more secure scheme for reactance type measurement for ground fault protection.

A further object of the present invention is to provide added margin against transient overreach for phase-to-ground faults of a reactance relay while providing shorter clearing times.

These and other objects of the present invention will become apparent to those skilled in the art upon consideration of the following description of one form of the invention.

SUMMARY OF THE INVENTION

This invention is directed to a characteristic timer for a protective relay wherein the phase characteristic is always integrating, but the ground characteristic changes from non-integrating to integrating as a function of input signal block width and a preselected cut-off time. The ground characteristic begins to integrate at the end of the preselected cut-off time or if the input signal exceeds a selectable preset check level during the cut-off time. If the input signal is less than or equal to the preset check level during the cut-off time, the timer will be non-integrating. In addition, operate level is fixed at a predetermined magnitude, for example 135 degrees when operating in conjunction with a ground relay and 120 degrees when operating in conjunction with a phase relay.

The features of the invention believed to be novel are set forth with particularity in the appended claims. The invention itself, however, both as to its organization and operation, together with further objects and advantages thereof, may best be understood by reference to the following description taken in conjunction with the accompanying drawings.

DETAILED DESCRIPTION OF THE PREFERRED EMBODIMENT

Figure 1A:
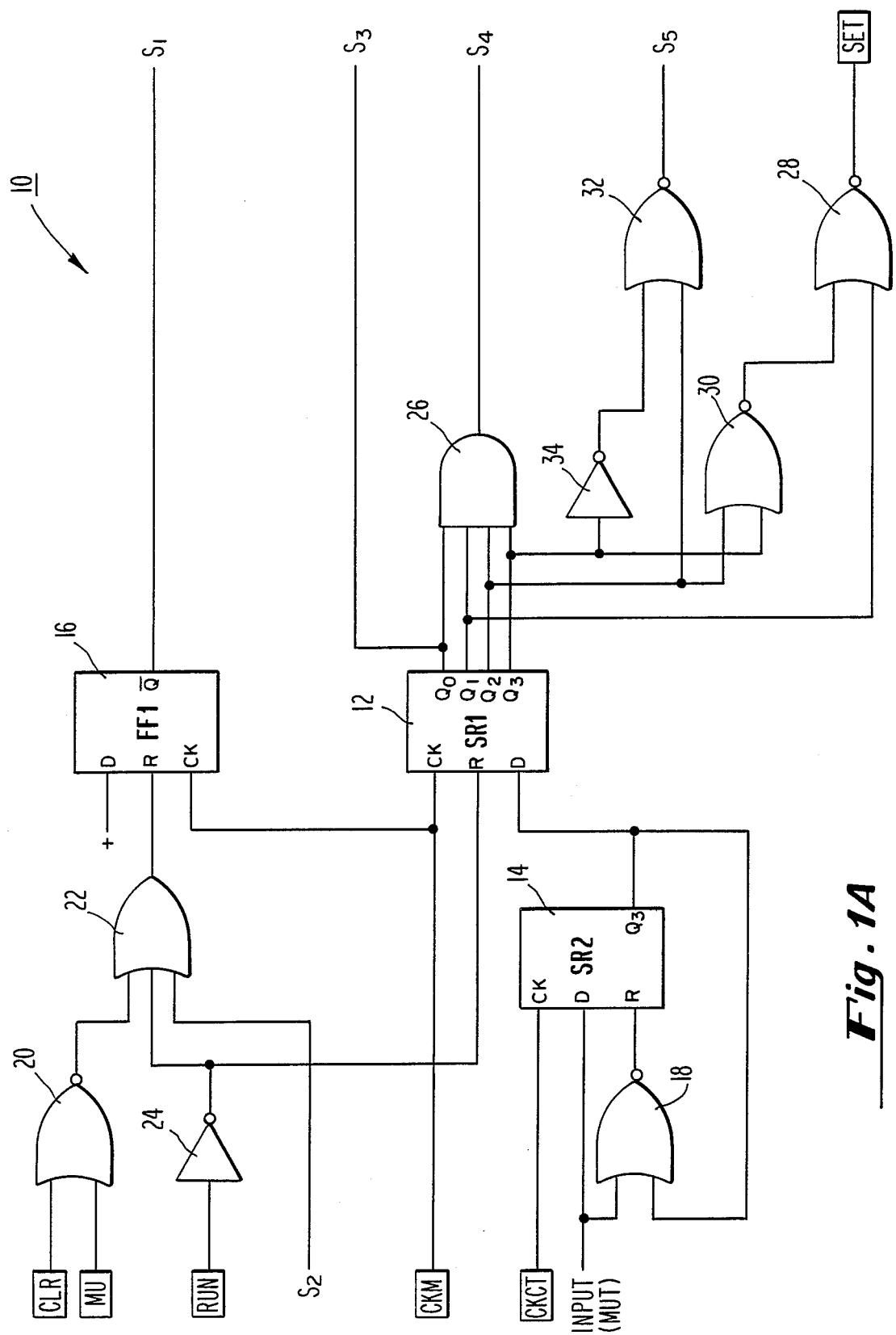
FIGS. 1A through 1C comprise a block diagram of the circuit arrangement of a characteristic timer in accordance with the present invention.
Figure 1B:
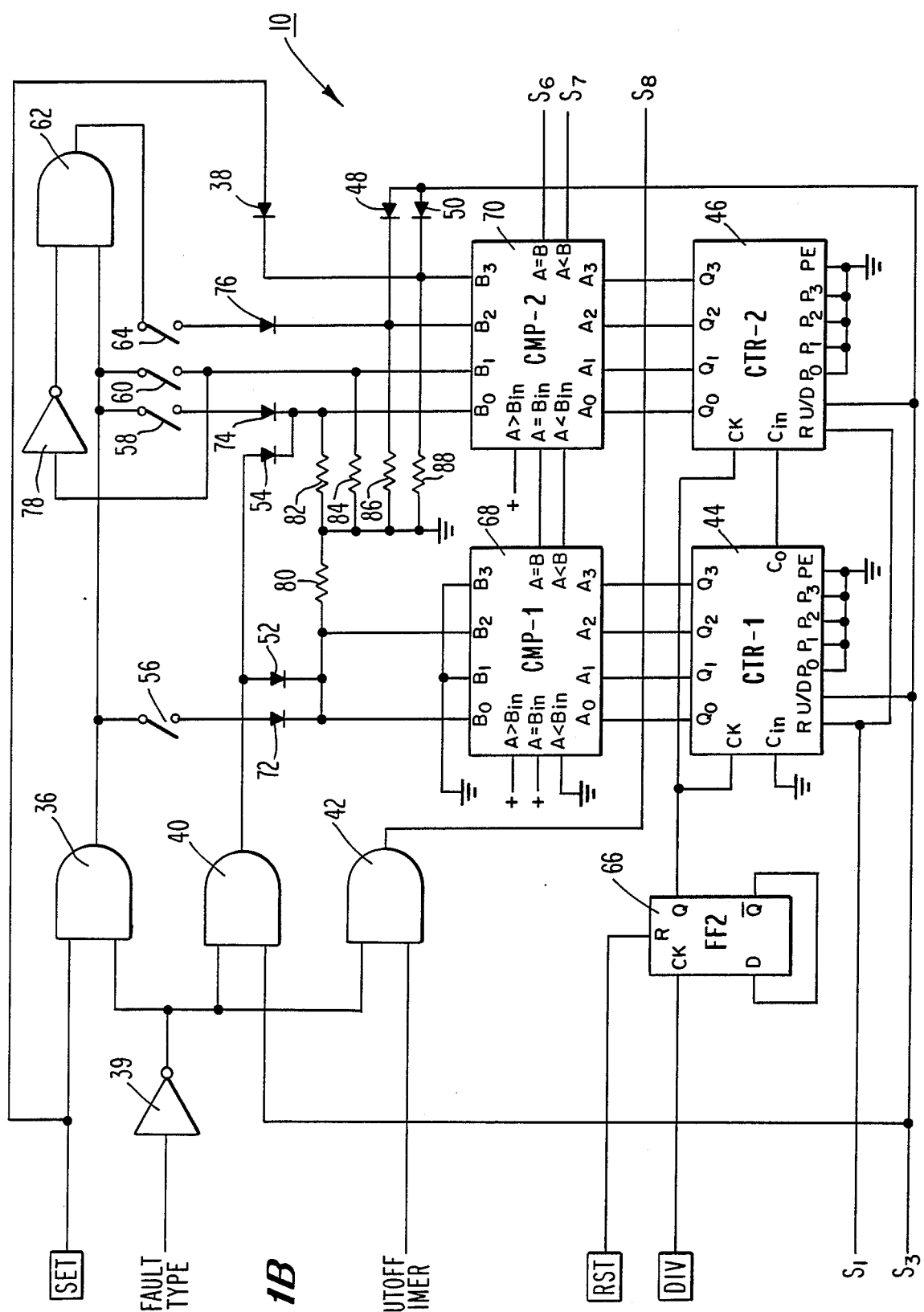
Figure 1C:
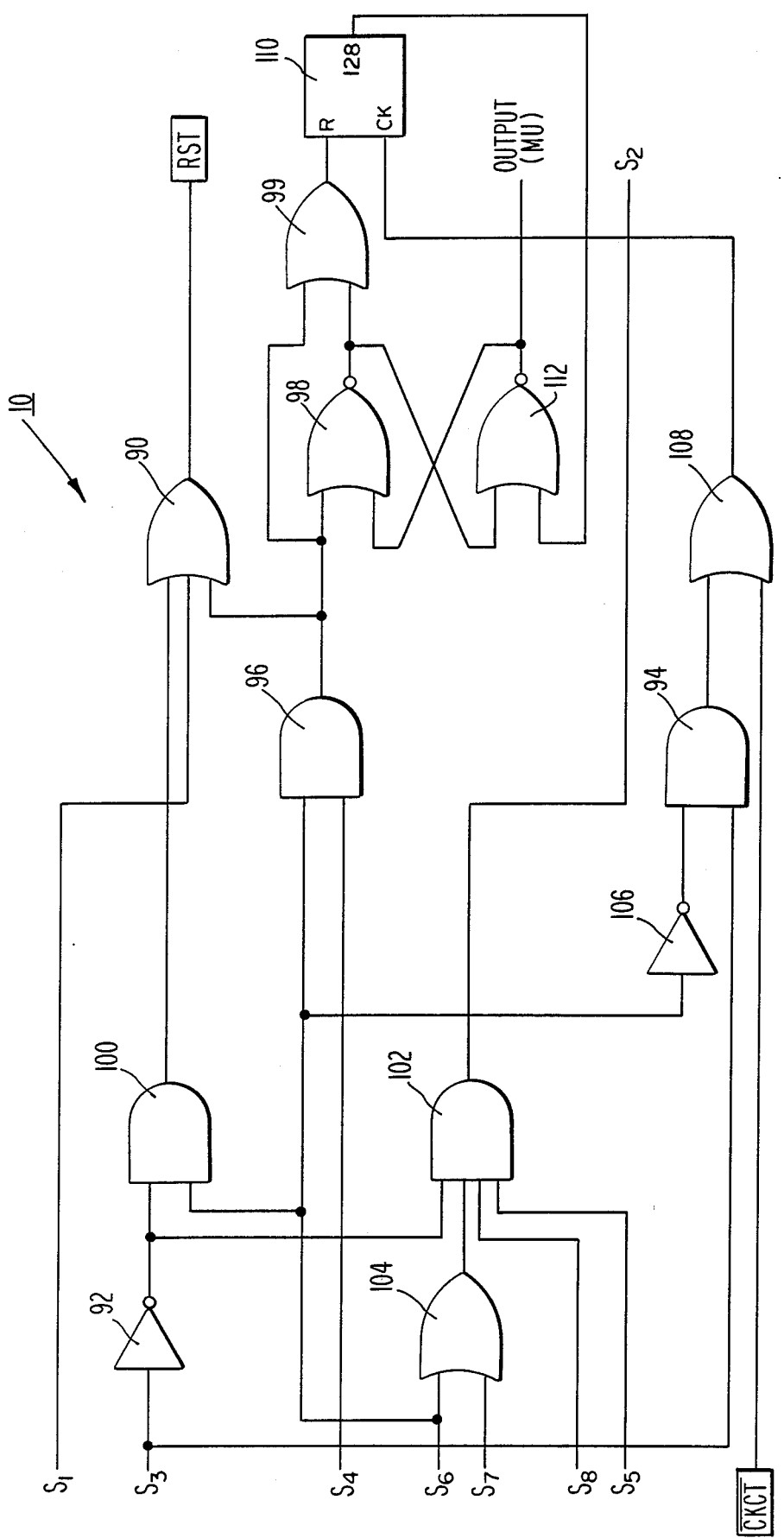

Referring now to FIGS. 1A through 1C, there is shown a block diagram of a preferred embodiment of a characteristic timer, generally designated 10, in accordance with the present invention. The characteristic timer 10 includes a first shift register 12 and a second shift register 14. The first and second shift registers 12 and 14 are preferably Motorola Type MC14015B Dual 4-Bit Static Shifter Registers", as shown and described in the manual entitled "Motorola CMOS Integrated Circuits", published by Motorola Inc., 3501 Ed Bluesteine Boulevard, Austin, Tex. 78721 which publication is incorporated in this application by reference as if fully set forth herein. A clock (CKM) signal from a clock source (not shown) is coupled to the clock input (CK)

of the first shift register 12, as well as the clock input (CK) of a first flip-flop 16. In the preferred embodiment, the clock signal has a frequency of 216 KH$_Z$. The first flip-flop 16 is preferably one-half of a Motorola Type MC14013B "Dual Type D-Flip-Flop", as shown and described in the aforementioned Motorola manual. A second clock signal (CKCT), generated by the clock source (not shown), is coupled to the clock input (CK) of the second shift register 14. The frequency of the second clock input is preferably 21.6 KH$_Z$ when the relay is operating in a 60 Hz power system or is 18 KH$_Z$ when the relay is operating in a 50 Hz system.

An input signal (MUT) is coupled to the D input of the second shift register 14 and one input of a first two input NOR gate 18. In the preferred embodiment, the first two input NOR gate 18 is part of a Motorola Type MC14001B "Quad 2-Input NOR Gate", as shown and described in the aforementioned Motorola manual. The output of the first two input NOR gate 18 is coupled to the reset input (R) of the second shift register 14. The Q$_3$ output of the second shift register 14 is coupled to the D input of the first shift register 12 and the second input of the first two input NOR gate 18. A reset to zero signal (CLR) is coupled to one input of a second two input NOR gate 20. This signal is generated by the protective relay in order to initialize or reset the characteristic timer back to zero. The second two input NOR gate 20 is preferably a part of a Motorola Type MC14001B "Quad 2-Input NOR Gate" as shown and described in the aforementioned Motorola manual. An output signal (MU), generated by another portion of the timer 10 as will be subsequently described, is coupled to the second input of the second two input NOR gate 20. The output of the second two input NOR gate is coupled to one input of a first three input OR gate 22. In the preferred embodiment, the first three input OR gate is part of a Motorola Type MC14075B "Triple 3-Input OR Gate", as shown and described in the aforementioned Motorola manual.

A run signal (RUN) is coupled to the input of a first inverter 24. The RUN signal is generated by the protective relay and enables the characteristic timer to operate. The first inverter 24 is preferably part of a Motorola Type MC14069UB "Hex Inverter" as shown and described in the aforementioned Motorola manual. The output of the first inverter 24 is coupled to a second input of the first three input OR gate 22 and the reset input (R) of the first shift register 12. A S$_2$ signal, the generation of which will be hereinafter described, is coupled to the third input of the first three input OR gate 22.

The output of the first three input OR gate 22 is coupled to the reset input (R) of the first flip-flop 16. The D input of the first flip-flop 16 is coupled to a permanent logic 1 (+) level. The $\overline{Q}$ output of the first flip-flip 16 is a signal (S$_1$) which is coupled to other components of the characteristic timer as will hereinafter be described. The Q$_0$ output of the first shift register 12 is coupled to a first first input of a 4-input AND gate 26. This Q$_0$ output is also identified as signal (S$_3$) which is coupled to other components of the characteristic timer 10 as will be hereinafter described. The first four input AND gate 26 is preferably part of a Motorola Type MC14082B "Dual 4-Input AND Gate", as shown and described in the aforementioned Motorola manual.

The Q$_1$ output of the first shift register 12 is coupled to a second input of the first 4-input AND gate 26 as well as an input of a third two input NOR gate 28. The Q$_2$ output of the first shift register 12 is coupled to a third input of the first 4-input AND gate 26 as well as an input of a fourth two input NOR gate 30 and an input of a fifth two input NOR gate 32. The third, fourth and fifth NOR gates, 28, 30 and 32 respectively, are each preferably part of a Motorola Type MC14001B "Quad 2-Input NOR Gate", as shown and described in the aforementioned Motorola manual.

The Q$_3$ output of the first shift register 12 is coupled to the fourth input of the first 4-input AND gate 26, the input of a second inverter 34 and the second input of the fourth two input NOR gate 30. The second inverter 34 is preferably part of a Motorola Type MC14069UB "Hex Inverter" as shown and described in the aforementioned Motorola manual. The output of the second inverter 34 is coupled to the second input of the fifth two input NOR gate 32. The output of the fourth two input NOR gate 30 is coupled to the second input of the third two input NOR gate 28. The output of the first 4-input AND gate 26 is a signal S$_4$ which is coupled to other components of the characteristic timer 10 as will be hereinafter described. The output of the fifth two input NOR gate 32 is a signal S$_5$ and the output of the third two input NOR gate 28 is a SET signal, both of which are coupled to other components of the characteristic timer 10 as will be hereinafter described.

Referring now to FIG. 1B, the SET signal is coupled to one input of a first two input AND gate 36 and the anode of a first diode 38. The first two input AND gate 36 is preferably part of a Motorola Type MC14081B "Quad 2-Input AND Gate", as shown and described in the aforementioned Motorola manual. A "FAULT-TYPE" signal is coupled to the input of a third inverter 39. In the preferred embodiment, the third inverter 38 is part of a Motorola Type MC14069UB "Hex Inverter", as shown and described in the aforementioned Motorola manual.

The output of the third inverter 39 is coupled to the second input of the first two input AND gate 36 as well as an input of a second input two input AND gate 40 and an input of a third two input AND gate 42. The second and third two input AND gates, 40 and 42 respectively, are each preferably part of a Motorola Type MC14081B "Quad 2-Input AND Gate", as shown and described in the aforementioned Motorola manual. A CUTOFF TIMER signal is coupled to the second input of the third two input AND gate 42. The CUTOFF TIMER signal is a pulse, having a preselected duration, which is generated by the protective relay upon detection of a fault. The duration of the CUTOFF TIMER signal is preferably adjustable from 0 to 390 milliseconds. The output of the third two input AND gate 42 is a signal S$_8$ which is coupled to other components of the characteristic timer 10 as will be hereinafter described. The S$_3$ signal, generated as previously described, is coupled to the second input of the second two input AND gate 40 as well as up/down (U/D) inputs of a first counter 44 and a second counter 46. The first counter 44 is preferably a Motorola Type MC14510B "BCD Up/-Down Counter", as shown and described in the aforementioned Motorola manual. The second counter 46 is preferably a Motorola Type MC14516B "Binary Up/-Down Counter", as shown and described in the aforementioned Motorola manual. The first and second counters are connected in cascade configuration by coupling the carry out (C$_0$) output of the first counter 44 to the carry in (C$_i$) of the second counter 46. The S$_3$ signal is also coupled to the anodes of a second and third diodes, 48 and 50, respectively. The output of second two input AND gate 40 is coupled to the anodes of fourth and fifth diodes, 52 and 54 respectively.

The output of the first two input AND gate 36 is coupled to a contact of a first switch 56, a contact of a second switch 58, and a contact of a third switch 60, as well as one input of a fourth two input AND gate 62. The fourth two input AND gate 62 is preferably part of a Motorola Type MC14081B "Quad 2-Input AND Gate", as shown and described in the aforementioned Motorola manual. The output of the fourth two input AND gate 62 is coupled to one contact of a fourth switch 64. The first, second, third and fourth switches, 56, 58, 60 and 64 will hereinafter be collectively referred to as the check level select switches.

A reset signal (RST), the generation of which will be hereinafter described, is coupled to the reset (R) input of a second flip-flop 66. The second flip-flop 66 is preferably part of a Motorola Type MC14013B "Dual D-Flip-Flip", as shown and described in the aforementioned Motorola manual. A divided clock signal (DIV), generated by the clock source (not shown) and preferably having a frequency of 43.2 KHz when operating with a 60 Hz power system or 36 KHz when operating with a 50 Hz power system, is coupled to the clock input (CK) of the second flip-flop 66. The $\overline{Q}$ output of the second flip-flop 66 is coupled to the D input thereof. The Q output of the second flip-flop is coupled to clock inputs (CK) of the first 44 and second 46 counters. The $S_1$ signal, generated as described above, is coupled to the reset inputs (R) of the first 44 and second 46 counters.

The $Q_0$, $Q_1$, $Q_2$, and $Q_3$ outputs of the first counter 44 are coupled to $A_0$, $A_1$, $A_2$, and $A_3$ inputs respectively of a first comparator 68. Likewise, the $Q_0$, $Q_1$, $Q_2$, and $Q_3$ outputs of the second counter 46 are coupled to the $A_0$, $A_1$, $A_2$, and $A_3$ inputs respectively of a second comparator 70. In the preferred embodiment, the first and second comparators, 68 and 70, are each a Motorola Type MC14585B "4-Bit Magnitude Comparator", as shown and described in the aforementioned Motorola manual. These devices each compare two four bit words (A and B) and determines whether they are "less than (<)", "equal to (=)" or "greater than (>)" by a logical high (+) level on the appropriate output. The first and second comparators, 68 and 70 are cascaded by coupling outputs (A<B) and A=B to the corresponding inputs of the second comparator 70, with the (A>B) input of the second comparator 70 being connected to a logical high (+). Inputs (A<B), (A=B), and (A>B) on the first comparator 68 are connected to a logical low (ground), a high (+) and a high (+), respectively.

The other contacts of check level select switches 56, 58 and 64 are respectively connected to the anodes of a sixth diode 72, a seventh diode 74 and eighth diode 76. The other contact of check level select switch 60 is connected to the input of a fourth inverter 78. The fourth inverter 78, is preferably part of a Motorola Type MC14069UB "Hex Inverter", as shown and described in the aforementioned Motorola manual. The output of the fourth inverter 78 is coupled to the second input of the fourth two input AND gate 62.

The cathodes of the fourth diode 52 and the sixth diode 72 are electrically connected to each other and to the $B_0$ and $B_2$ inputs of the first comparator 68 and to one terminal of a first resistor 80. The other terminal of a first resistor 80 is connected to one terminal of each of a second 82, a third 84, a fourth 86, and fifth 88 resistors.

The cathodes of the fifth 54 and seventh 74 diodes are connected to each other and to the other terminal of the second resistor 82 as well as the $B_0$ input of the second comparator 70. The other terminal of the third resistor 84 is connected to the input of the fourth inverter 78 as well as the $B_1$ of the second comparator 70. The other terminal of the fourth resistor 86 is connected to the cathodes of the eighth diode 76 and the second diode 48 as well as the $B_2$ input of the second comparator 70. The other terminal of the fifth resistor 88 is connected to the cathodes of the first diode 38 and the third diode 50 as well as the $B_3$ input of the second comparator 70. The A=B and A<B outputs from the comparator 70 are signals $S_6$ and $S_7$ respectively which are coupled to other components of the characteristic timer 10 as will be hereinafter described. The output from the third two input AND gate 42 is a signal $S_8$ which is coupled to another component of the characteristic timer 10 as will be hereinafter described.

Referring now to FIG. 1C, the $S_1$ signal, generated as previously described, in coupled to one input of a second three input OR gate 90. The output of the second three input NOR gate 90 is a reset signal (RST) which is coupled to the second flip-flop 66 as previously described. The $S_3$ signal, generated as previously described, is coupled to the input of a fifth inverter 92 as well as one input of a fifth two input AND gate 94. In the preferred embodiment, the fifth inverter 92 is part of a Motorola Type MC14069UB "Hex Inverter" and the fifth two input AND gate 94 is part of a Motorola Type MC14081B "Quad 2-Input AND Gate", both of which are shown and described in the aforementioned Motorola manual. The $S_4$ signal, generated as previously described is coupled to one input of a sixth two input AND gate 96. The two input AND gate 96 is preferably part of a Motorola Type MC14081B "Quad 2-Input AND Gate", as shown and described in the aforementioned Motorola manual. The output of the sixth two input AND gate 96 is coupled to a second input of the second three input OR gate 90 as well as one input of a sixth two input NOR gate 98 and one input of a first two input OR gate 99. In the preferred embodiment, the sixth two input NOR gate 98 is preferably part of a Motorola Type MC14001B "Quad 2-Input NOR Gate" and the first two input OR gate 99 is part of a Motorola Type MC14071B "Quad 2-Input OR Gate", as shown and described in the aforementioned Motorola manual.

The $S_6$ signal, generated as previously described, is coupled to the second input of the sixth two input AND gate 96 as well as one input of a seventh two input AND gate 100. The seventh two input AND gate 100 is preferably part of a Motorola Type MC14081B "Quad 2-Input AND Gate", as shown and described in the aforementioned Motorola manual. The output of the fifth inverter 92 is coupled to the second input of the seventh two input AND gate 100 as well as one input of a second four input AND gate 102. In the preferred embodiment, the second four input AND gate 102 is preferably part of a Motorola Type MC14082B "Dual 4-Input AND Gate", as shown and described in the aforementioned Motorola manual. The $S_6$ signal is also coupled to one input of a second two input OR gate 104. The second two input OR gate 114 is preferably part of a Motorola Type MC14071B "Quad 2-Input OR Gate", as shown and described in the aforementioned Motorola manual. The $S_7$ signal, generated as previously described, is coupled to the second input of the second two input OR gate 104. The $S_6$ is also coupled to the input of a sixth inverter 106. The sixth inverter 106 is preferably part of a Motorola Type MC14069UB "Hex Inverter", as shown and described in the aforementioned Motorola manual. The output of the sixth inverter 106 is coupled to the second input of the fifth two input AND gate 94. The output of the fifth two input AND gate 94 is coupled to one input of a third two input OR gate 108. The third two input OR gate 108 is preferably part of a Motorola Type MC14071B "Quad 2-Input OR Gate", as shown and described in the aforementioned Motorola manual.

The inverse of the second clock signal (CKCT) is coupled to the second input of the third two input OR gate 108. The output of the third two input OR gate 108 is connected to the clock (CK) input of a 12 bit binary counter 110. The counter 110 is preferably a Motorola Type MC14040B "12-Bit Binary Counter", as shown and described in the aforementioned Motorola manual. The $Q_7$ output (128 count) of the counter 110 is coupled to one input of a seventh two input NOR gate 112. In the preferred embodiment, the seventh two input NOR gate 112 is part of a Motorola Type MC14001B "Quad 2-Input NOR Gate", as shown and described in the aforementioned Motorola manual. The output of sixth two input NOR gate 98 is coupled to the second input of seventh two input NOR gate 112 as well as the second input of the first two input OR gate 99. The output of the first two input OR gate 99 is coupled to the reset input of the 12 bit binary counter 110. The output of the seventh two input NOR gate 112 is the MU signal which was previously described and which is coupled to the second input of the sixth two input NOR gate 98. The output of second four input AND gate is the $S_2$ signal which was previously described.

The characteristic timer 10 of the present invention operates as follows. The input signal MUT is developed by a portion (not shown) of the protective relay which monitors and responds to faults that may occur on the transmission line. One such protective relay is described in U.S. Pat. No. 4,405,966, assigned to the same assignee as the present invention, and incorporated in the present application as if fully set forth herein. This patent describes a development of signals such as $V_{POL1}$ and $V_{OP1}$ having a desired phase relationship. The $V_{POL1}$ and $V_{OP1}$ are applied to an AND circuit having an output which, in turn, is applied to a timer which generates a trip command to an external breaker associated with a portion of the transmission line. The output signal of the AND circuit shown in the aforementioned patent, is similar to the MUT signal applied to the characteristic timer of the present invention. Furthermore, one of the functions or usages of the timer described in the aforementioned patent is similar to one of the uses of a characteristic timer of the present in a protective relay.

Figure 2:
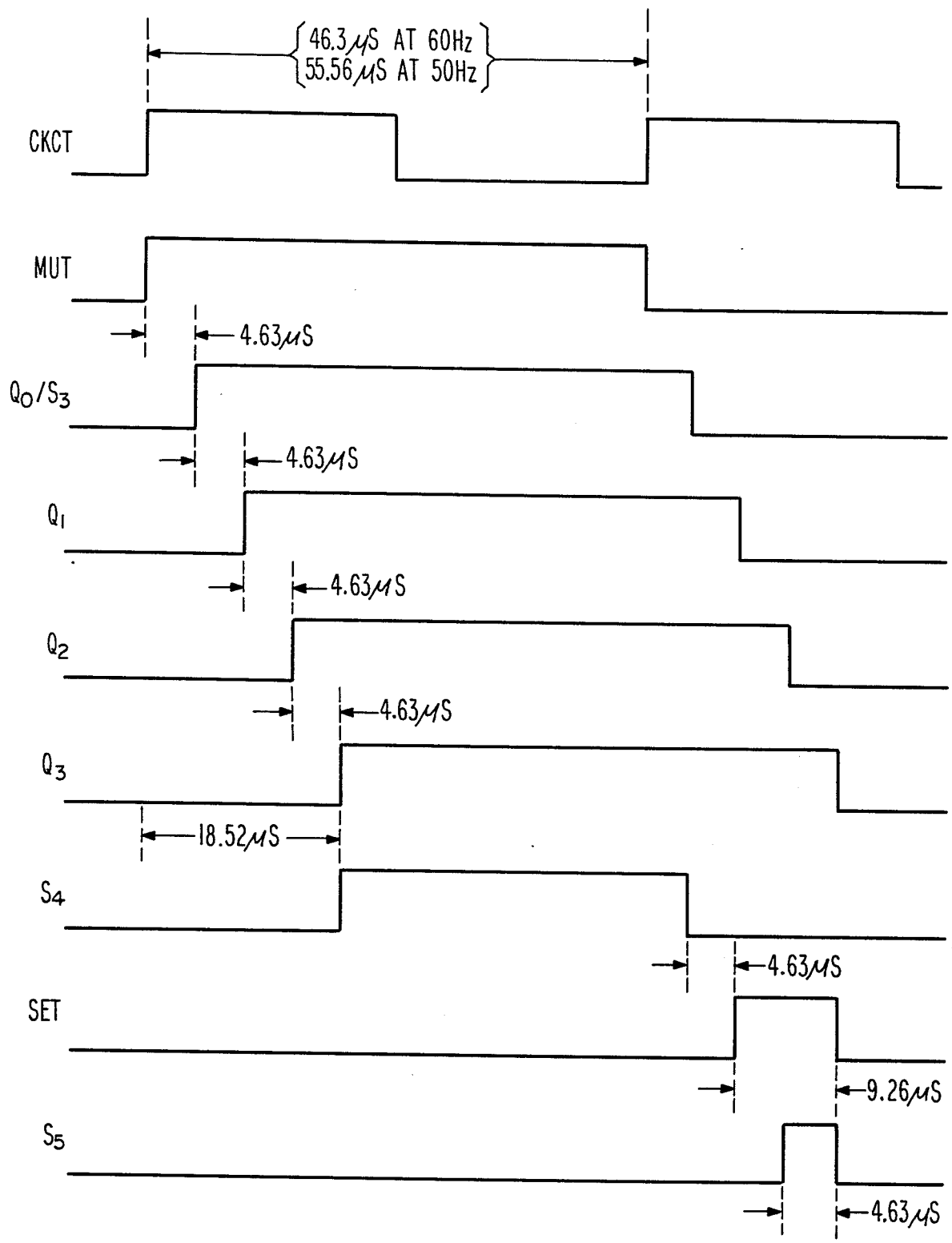
FIG. 2 depicts the timing relationship between signals generated at certain points in the characteristic timer of the present invention.

The protective relay, upon detection of a phase coincidence between two signals, such as $V_{POL1}$ and $V_{OP1}$, generates the MUT signal which is a fixed repetition rate pulse train with a variable on time. The on time, or high portion of the MUT signal, is a function of the location of the fault on the protected line. It is preferred that each cycle of the MUT signal be equal to 180 degrees. Consequently, when the on time, or high portion, is equal to or greater than the off time, or low portion, the coincidence of $V_{POL1}$ and $V_{OP1}$ is equal to or greater than 90 degrees, indicating the occurrence of a fault within the protected zone of the relay. The MUT signal is filtered by the second shift register 14 and the first NOR gate 18, and is then coupled to the D input of the first shift register 12. The first register 12 sets up the necessary timing for the circuit to operate. The timing diagram shown in FIG. 2 shows the relationship of the Q outputs of the first register 12 with respect to the filtered MUT signal as well as the counterclock signal (CKCT). As shown in FIG. 2, the timing signals are generated during the counterclock cycle.

The up/down counters, 44 and 46, count up or down in response to the $Q_0$ output (signal $S_3$) of the first shift register 12. When $S_3$ is high, the Q outputs of counters 44 and 46 are incremented, and when $S_3$ is low, the Q outputs are decremented. The count of the Q outputs of the first and second up/down counters, 44 and 46, are applied to the A inputs of the first and second comparators which compares the input count to a desired operate or check level setting. The desired operate or check level setting is set by application of high or low signals to the $B_0$ through $B_3$ inputs of the comparators 68 and 70. A high signal applied to the $B_0$ and $B_2$ inputs of the first comparator 68 will produce a level setting of 5. A high signal applied to the B inputs of the second comparator 70 will produce level settings of 10 for $B_0$, 20 for $B_1$, 40 for $B_2$ and 80 for $B_3$.

The desired level setting is determined by the FAULT TYPE signal, count up or down ($S_3$ signal), or the SET signal. For phase faults, the FAULT TYPE signal is high. Since the FAULT TYPE signal is coupled to inverter 39, the output of inverter 39 will be low for phase type faults which will cause the output of AND gate 36 to be low. Consequently, check level switches 56, 58, 60 and 64 will have no effect on the magnitude of the level setting. Similarly, the output from AND gate 40 will also be low, thereby having no effect on the level setting through diodes 52 and 54. As a result, an operate level setting will be set by the up/down signal $S_3$ during the up count portion ($S_3$ high) of the operation. This high signal will be applied to inputs $B_2$ (for a level setting of 40) and $B_3$ (for a level setting of 80) for a total operate level setting 120. Although an operate level setting of 120 for phase faults is preferred as a result of empirical determinations, other operate level settings are also effective and are deemed to be within the scope and contemplation of the present invention.

During ground type faults, a count up signal ($S_3$ high) causes the first comparator 68 to receive an operate level setting of 5 due to a high output from AND gate 40 being applied to the $B_0$ and $B_2$ inputs through diode 52. The second comparator 70 is set at 130 due to the high output of AND gate 40 which is applied to the $B_0$ input of the second comparator 70 through diode 54 (for a level setting of 10) and the high signal $S_3$ being applied to the $B_2$ (for a level setting of 40) and $B_3$ (for a level setting of 80) inputs of the second comparator 70. Consequently, it can be seen that during count up for a ground fault, the magnitude of the operate level setting is 135. Although it it preferred that the operate level setting be 135 in this case as a result of empirical determinations, other operate level settings will be effective and are deemed to be within the scope and contemplation the present invention. Extensive testing on a model power system and computer simulator have shown that an operate level setting of 120 for phase faults and an operate level setting of 135 for ground faults will provide optimum performance. When the SET signal input to AND gate 36 is low, the output of gate 36 is low thus removing the high signal from the check level select switches and consequently removing the previously described check level setting input.

The A=B output of the second comparator 70 (signal $S_6$) is a logical one (high) when the up count is equal to the preset operate or check level setting. An output is then produced via AND gate 96 (when signal $S_4$ is high) NOR gates 98 and 112, OR gate 99 and binary counter 110. The count is terminated at this value since the high signal at the output of AND gate 96 causes a high RST signal at the output of OR gate 90 which is coupled to the reset input R of the second flip-flop 66 thereby stopping the clock.

For ground type faults, the FAULT TYPE signal is low therefore causing a high signal at the output of inverter 39 which then enables a high SET signal to produce a high at the output of AND gate 36. The high from AND gate 36 is applied to the level setting inputs of the comparators 68 and 70 through check level select switches 56, 58 and 60 and through switch 64 when AND gate 62 is enabled by a low signal input to inverter 78. This will occur whenever check level select switch 60 is open, causing the input of inverter 78 to be grounded through resistor 84. Consequently, when the SET signal level is high, the comparator will be programmed with a check level setting having a magnitude determined by the positions of the check level select switches 56, 58, 60 and 64.

When counting down during a ground fault, the SET signal energizes the check level select switches 56, 58, 60 and 64 via AND gate 36 for 9.26 microseconds. 4.6 microseconds after it is energized, the signal output from NOR gate 32 ($S_5$) is applied to AND gate 102. If it is a ground fault and the cut off timer input (MUT) is high and the count is less than or equal to the check select setting produced by the check select switches, a reset signal ($S_1$) is generated resetting the count to zero. This is the non-integrating operation as previously described. If any of the above conditions were not met; that is, existence of a phase fault, cut off timer input low, count greater than the check select setting, then the counters 44 and 46 would count down until they reach zero where the count would stop via AND gate 100, OR gate 90, and the second flip-flop 66 by stopping the clock.

Figure 3:
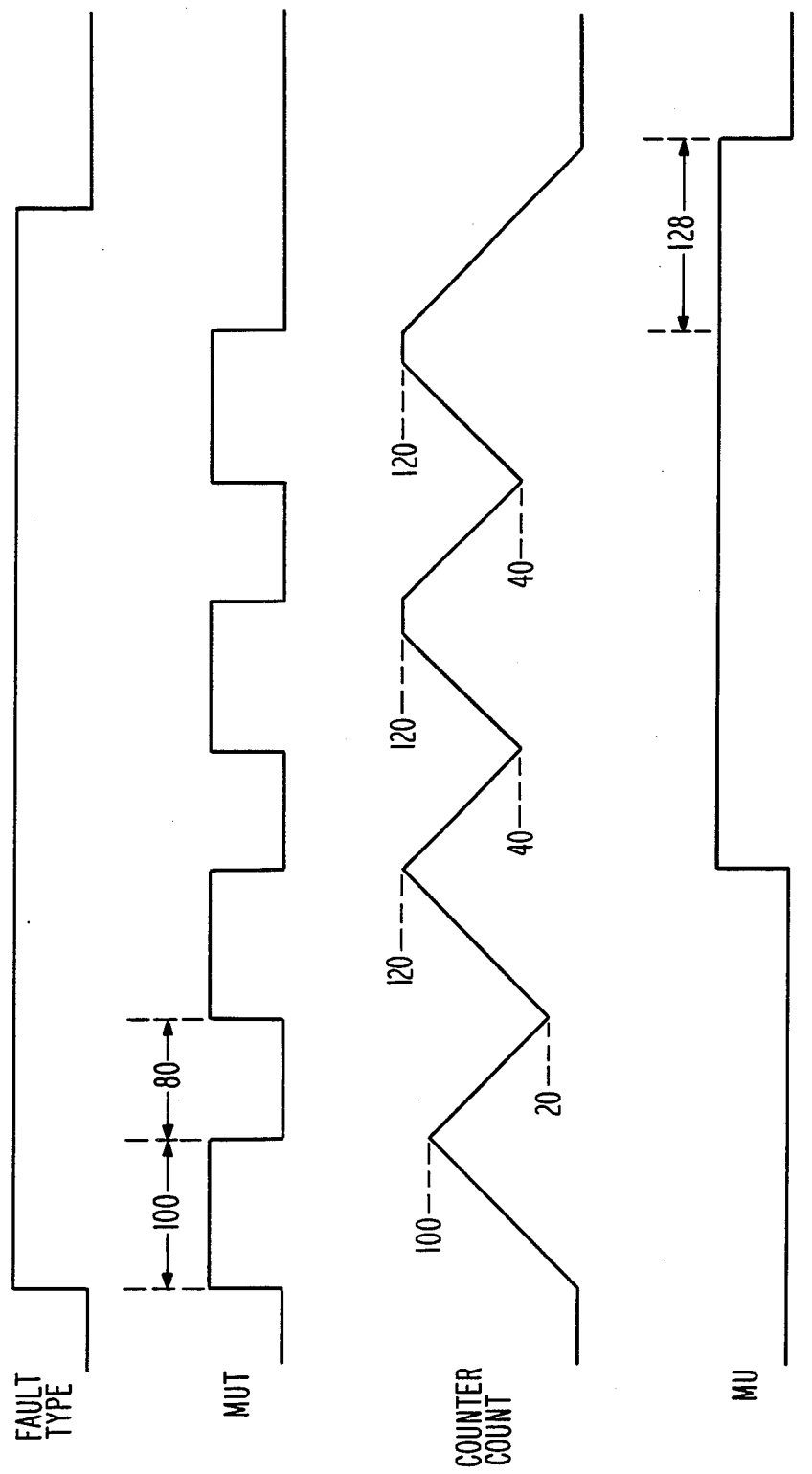
FIG. 3 depicts signals generated by of the characteristic timer for a phase fault.

Examples of operation of the characteristic timer 10 of the present invention are as follows. FIG. 3 illustrates the operation of the characteristic timer of the present invention for a phase fault. For this type of fault, the FAULT TYPE signal is high as shown at the top of FIG. 3. Integration is shown by the count at counter 1 and counter 2 outputs ($Q_0$ through $Q_3$) ramping up to 100, since the on time of the input is 100 counts wide; then ramping down to 20 since the off time of the input is 80 counts wide (100−80=20). This ramping up and down continues as long as the input signal (MUT) is received. However, as shown in FIG. 3, the ramping up plateaus at 120 counts, the operate level setting for phase faults which is set via diodes 48 and 50. As also shown in FIG. 3, an output signal (MU) is generated when the output of the counters 44 and 46 equals 120. This output signal (MU) is utilized to trip the appropriate circuit breakers necessary to remove power from the faulted line. The MU signal then remains for 128 counts after the counter count begins ramping down from the last 120 count plateau. For phase faults, cutoff timer settings are disregarded.

Figure 4:
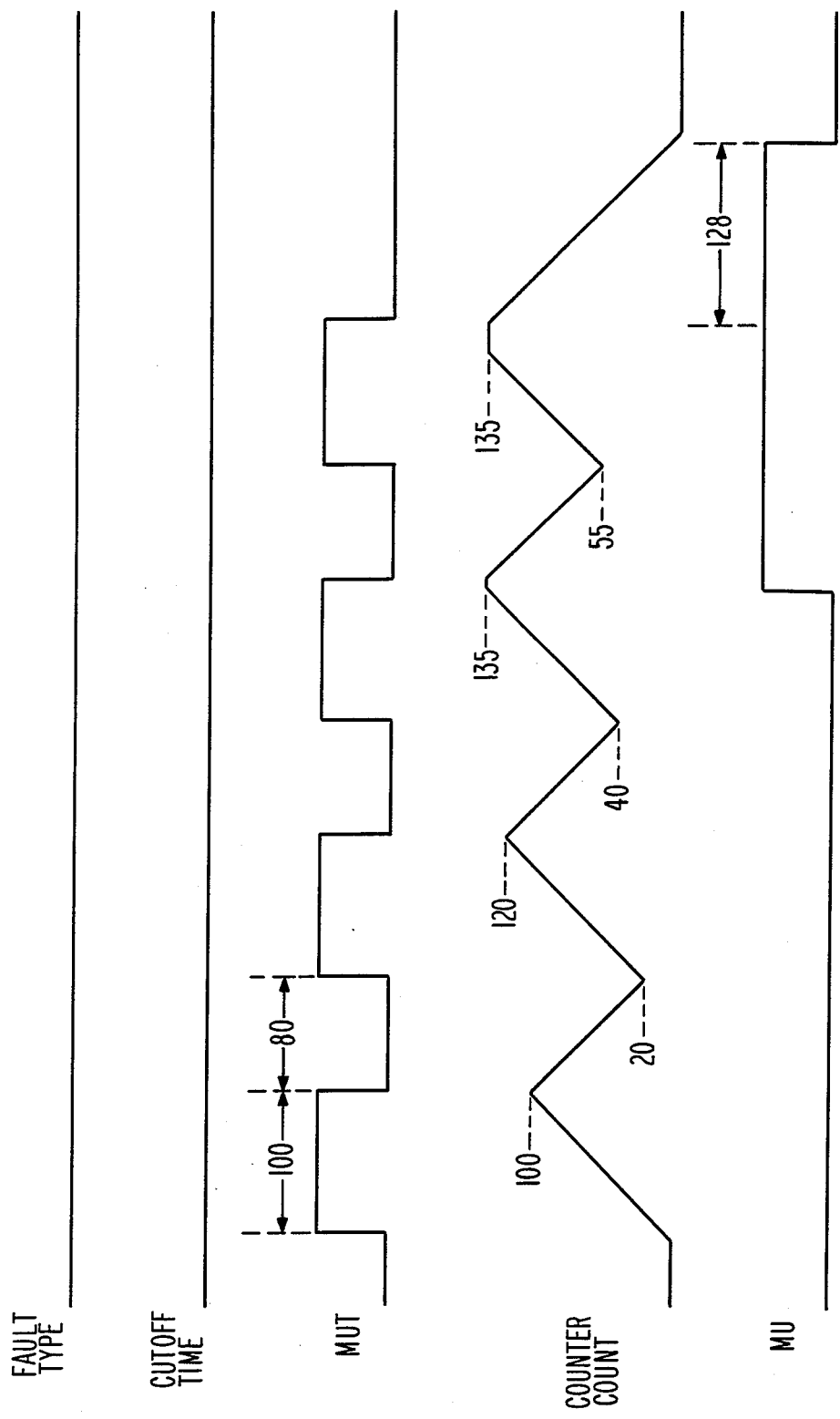
FIG. 4 depicts signals generated by the characteristic timer for a ground fault where cut off time is set to zero.

FIG. 4 illustrates the characteristic timer operation for ground faults (FAULT TYPE signal low) and where the cut off time is set to zero. This action is similar to the condition depicted in FIG. 3, except that the operate level is now 135 counts as determined by the high output from AND gate 40 through diodes 52 and 54 and the high $S_3$ signal through diodes 48 and 50. Since the cut off time is set to zero, the characteristic timer will always operate in the integrating mode, ramping up and down until it reaches the 135 count plateau, at which time the output signal MU is generated. The output signal MU remains high until 128 counts following the end of the last plateau.

Figure 5:
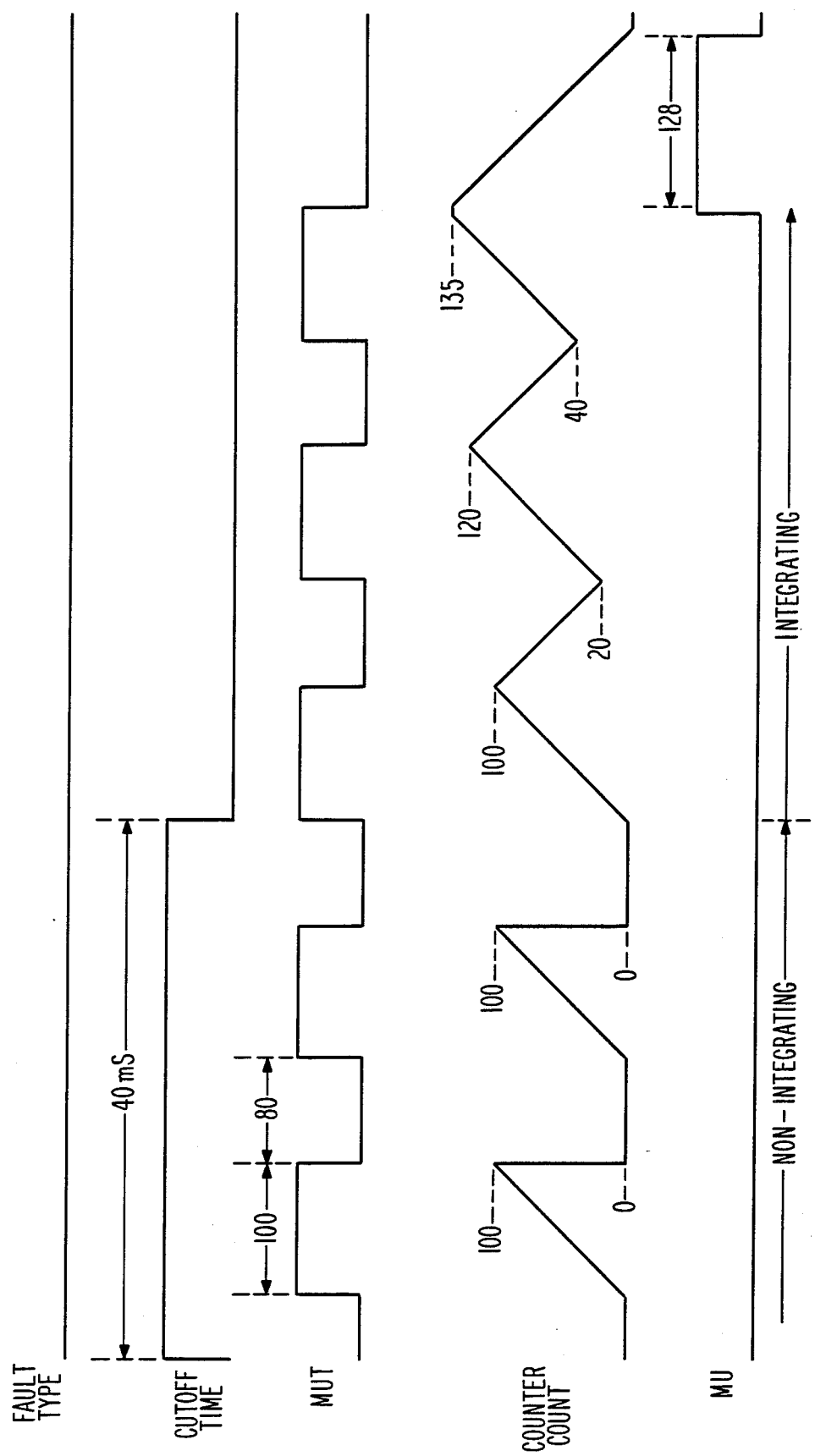
FIG. 5 depicts signals generated during non-integrating and integrating operations of the characteristic timer for ground faults when cut off time is set greater than zero and the input block is less than or equal to a preset check level setting.

FIG. 5 depicts the non-integrating/integrating operation for ground faults (FAULT TYPE signal low) where the cut off timer is set greater than zero (40 milliseconds in this example) and the input block (assumed to be 100 counts wide) is less than or equal to the check level setting (set at 100 in this example). As shown in FIG. 5, the characteristic timer 10 operates in its non-integrating mode during the preset cut off time since the input block, which is assumed to be 100 counts wide, is not greater than the value of the check level setting, which is deemed 100 in this example. Upon expiration of the cutoff time, the timer 10 begins to operate in the integrating mode. This occurs regardless of the relative values of the input block and the check setting. As can be seen in FIG. 5, during the non-integrating phase, the counter count immediately resets to zero at the termination of the input (MUT) pulse. The integrating operation, which commences at the expiration of the cut off time pulse, is similar to that described with respect to FIGS. 3 and 4.

Figure 6:
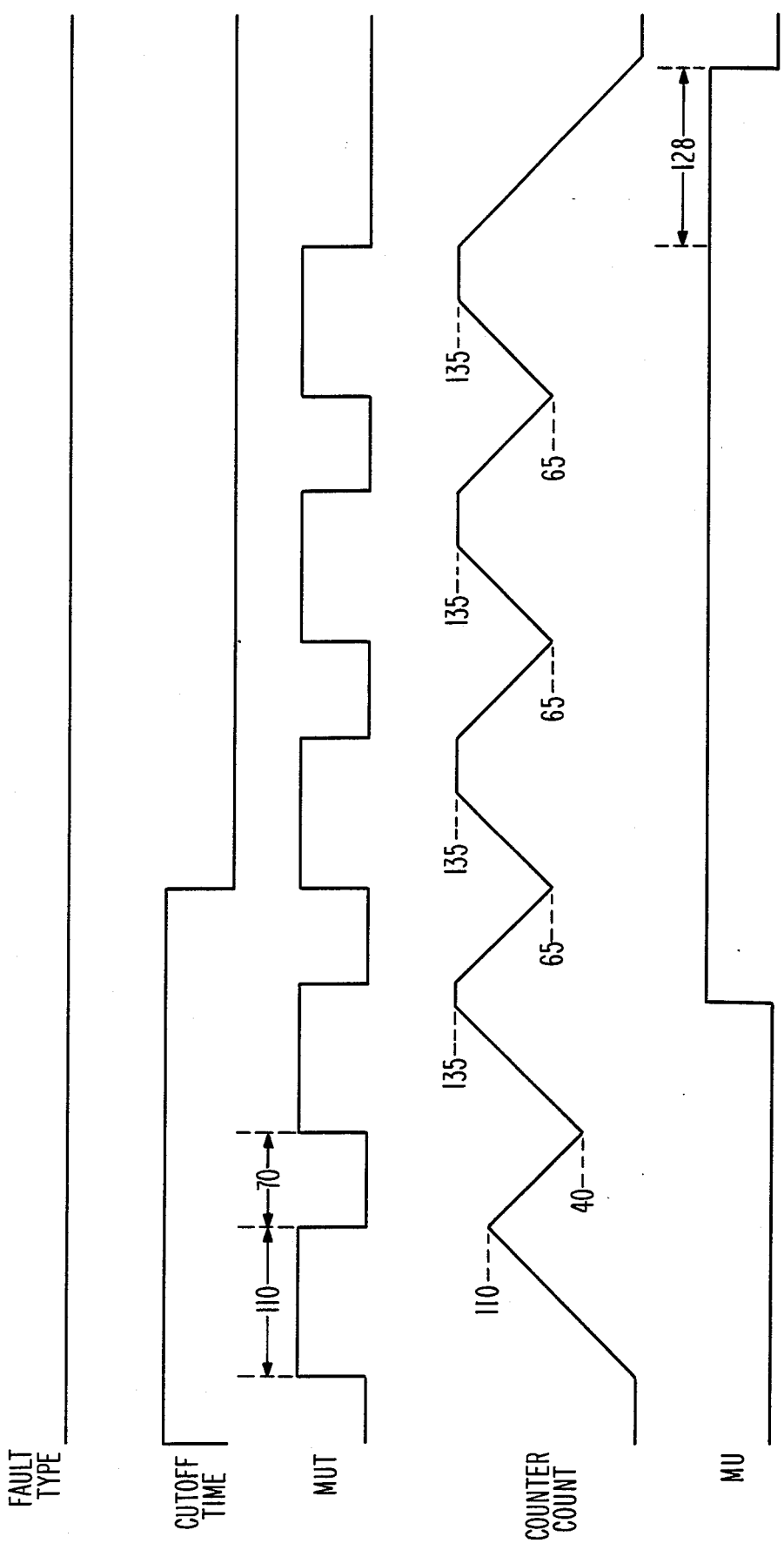
FIG. 6 depicts signals generated by the characteristic timer for ground faults when cut off time is set greater than zero and the input block is greater than the check level setting.

FIG. 6 depicts a timing diagram of timer signals under conditions which are similar to that shown in FIG. 5 except that the input blocks are 110 counts rather 100 counts wide. Since the count in FIG. 6 is greater than the check setting, which is assumed to be 100, the circuit operates in its integrating mode, even though it is within the preset cut off time of 40 milliseconds. Once again, the timer generates an output signal MU as soon as the counter count the operate level setting of 135. The output signal MU remains high until 128 counts after the count begins decrementing from the last plateau.

Figure 7:
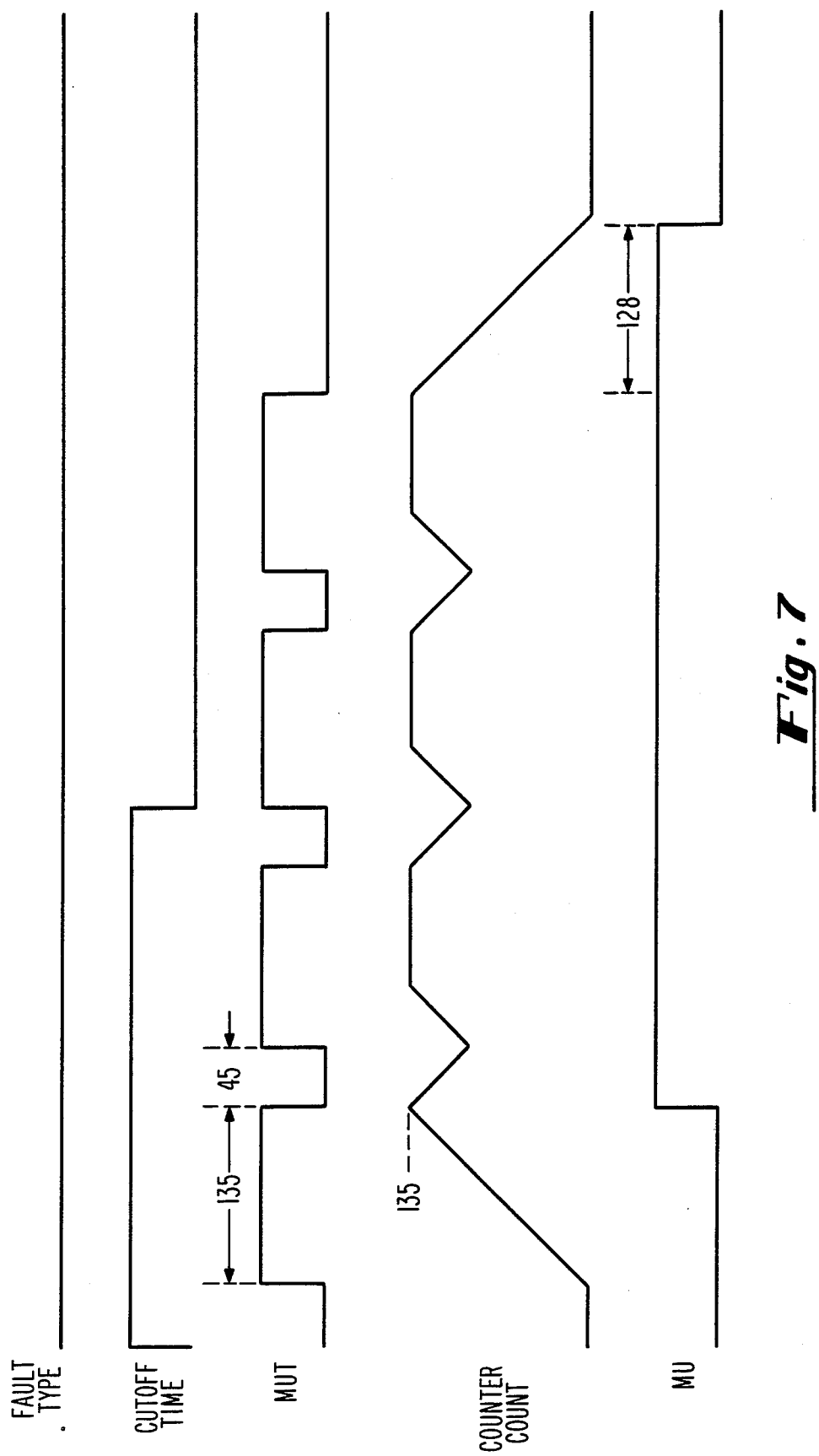
FIG. 7 depicts signals generated by the characteristic timer for ground faults when the cut off time is set greater than zero and the input block is equal to a predetermined operator level setting.

FIG. 7 depicts a timing diagram of timer signals under conditions which are similar to that shown in FIG. 6 except that the input blocks are 135 counts wide. Under these conditions, the counter reaches the 135 count operate level setting during the first count up, thereby generating the MU high signal output which remains high until 128 counts after the count begins decrementing from the last 135 count plateau.

As can be seen from the above description, the characteristic timer of the present invention operates quickly (at 135 counts) for those faults which are unqualifiedly determined to be within the reach of the relay; that is, wherein the coincidence of the $V_{POL}$ and $V_{OP}$ signals are equal to or greater than 135°. FIG. 6 shows that the characteristic timer of the present invention will still quickly operate if the input block continues to exceed the check level setting until the operate level setting is reached. This being indicative of a situation where it is highly probable that the fault is non-transient and lies within the relay reach. FIG. 5 depicts that situation where the input block does not exceed the check level setting during the cut off time but the accumulative count during the integrating period reaches the operate level setting. This is indicative of a condition where the location of the fault cannot be determined with certainity; therefore, a delay in operation of the characteristic timer is desirable in order to insure that the fault is non-transient and remains within the reach of the relay.

While the invention has been particularly shown and described with reference to the preferred embodiment thereof, it will be understood by those skilled in the art that various changes in form and detail may be made therein without departing from the true spirit and scope of the invention as defined by the appended claims.

What is claimed is:

1. A characteristic timer for use with a protective relay, which timer receives an applied signal comprising a pulse train, each pulse thereof having a pulse width which is representative of normal or fault conditions of a portion of an AC transmission line associated with a protective relay, said timer comprising:
   (a) means for receiving a cut off time signal which establishes a cut off time period;
   (b) means for receiving a fault type signal which indicates the occurrence of at least a first type of fault condition; and
   (c) means acting upon occurrence of said first type fault condition and during said cut off time period for:
      (i) measuring the magnitude of the width of each pulse in said applied signal;
      (ii) determining an integrated magnitude of pulse widths which exceed a predetermined check level; and
      (iii) generating an output signal whenever the pulse width magnitude or the integrated pulse width magnitude exceeds a first predetermined operate level magnitude.

2. A characteristic timer in accordance with claim 1 additionally comprising means acting upon expiration of said cut off time period for:
   (a) determining an integrated magnitude of the width of the pulses in said pulse train; and
   (b) generating said output signal whenever the integrated pulse width magnitude exceeds said first predetermined operate level magnitude.

3. A characteristic timer in accordance with claim 2 additionally comprising means for receiving a fault type signal which indicates the occurrence of a second type fault condition; and means action upon occurrence of said second type fault condition for:
   (a) determining an integrated magnitude of the widths of the pulses in said pulse train; and
   (b) generating said output signal whenever the integrated pulse width magnitude exceeds a second predetermined operate level magnitude.

4. A characteristic timer in accordance with claim 3 wherein said first type fault condition comprises a ground fault and second fault type comprises a phase fault.

5. A characteristic timer in accordance with claim 4 wherein said means for measuring the pulse width magnitude, determining the integrated pulse width magnitude and generating said output signal comprises:
   (a) means for receiving a clock pulse train comprising a plurality of pulses having a predetermined pulse repetition rate proportional to the frequency of the power source supplying the AC transmission lines;
   (b) an up/down digital counter for receiving the applied and clock pulse train signals, and having a digital content that is altered in response to the presence and the absence of the applied signal at a rate determined by the repetition rate of the clock pulse train, the up/down counter generating a first digital signal representative of its digital content;
   (c) means for selecting a second digital signal representative of said check level magnitude and a third digital signal representative of said first operate level magnitude; and
   (d) comparator means rendered effective by said applied signal, said cut off time period and said first fault type signal, and responsive, when effective, to:
      (i) the first digital signal and the second digital signal for generating a reset signal to the up/down counter when the first digital signal is less than or equal to the second digital signal, and for generating a count down signal to the up/down counter when the first digital signal is greater than the second digital signal at the end of an applied pulse; and
      (ii) the first digital signal and the third digital signal for developing said output signal when the first digital signal is greater than or equal to the third digital signal.

6. A characteristic timer in accordance with claim 5 wherein said comparator means is rendered effective by said applied signal, expiration of said cut off time period and said first fault type signal, and is responsive, when effective, to the first digital signal and the third digital signal for generating a count down signal to the up/down counter when the first digital signal is less than the third digital signal at the end of an applied pulse; and for developing said output signal when the first digital signal is greater than or equal to the third digital signal.

7. A characteristic timer in accordance with claim 6 additionally comprising means for selecting a fourth digital signal representative of said second operate level magnitude and wherein said comparator means is rendered operational by said applied signal and said second fault type signal and is responsive, when effective, to the first digital signal and the fourth digital signal for generating a down count signal to the up/down counter when the first digital signal is less than the fourth digital signal at the end of an applied pulse, and for developing said output signal when the first digital signal is greater than or equal to the fourth digital signal.

* * * * *